Patented Mar. 7, 1939

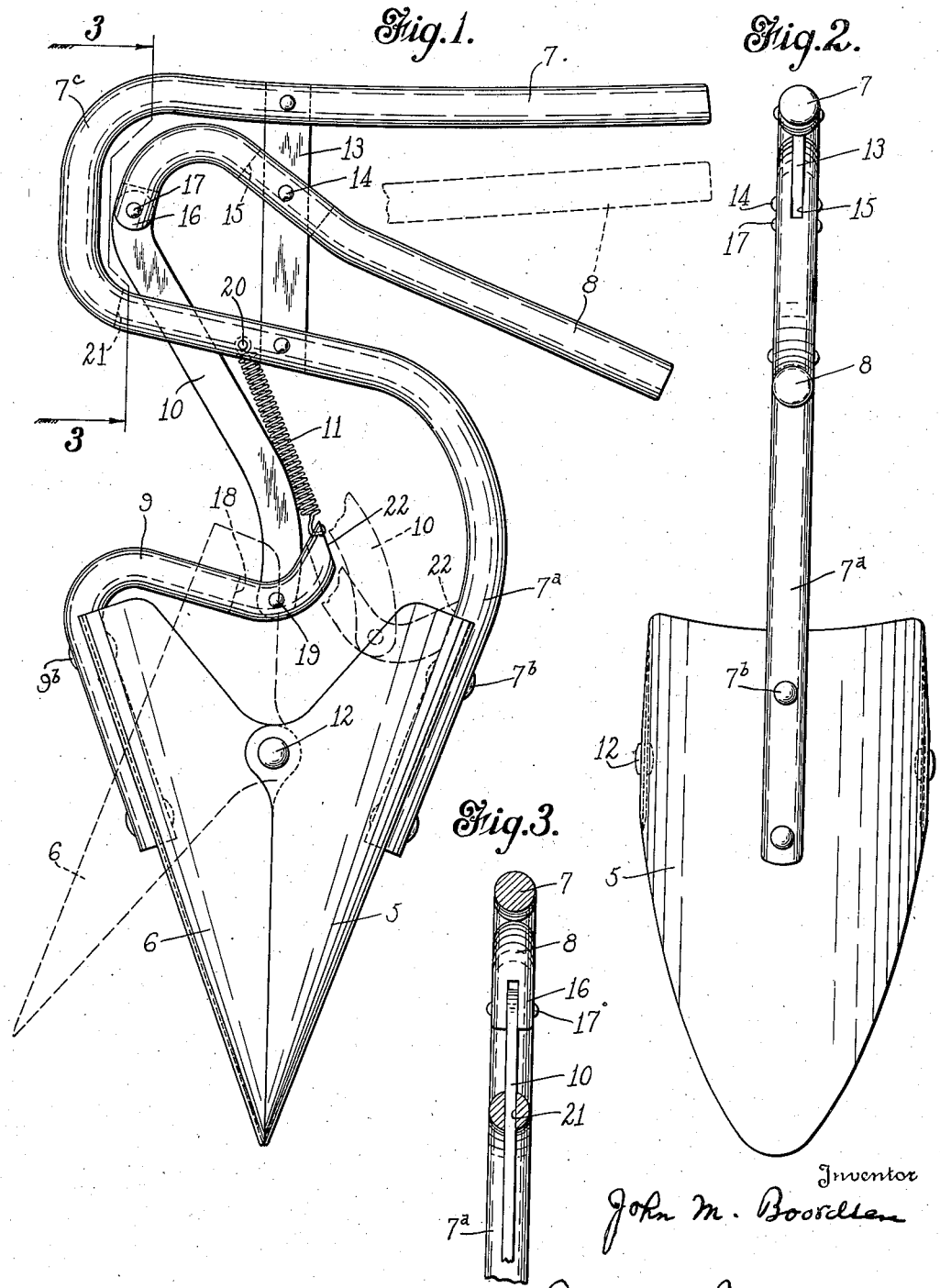

2,149,880

UNITED STATES PATENT OFFICE 2,149,880

SOIL OPENER FOR PLANTING BULBS AND THE LIKE

John M. Boordsen, New London, Conn.

Application February 24, 1938, Serial No. 192,306

6 Claims. (Cl. 55—68)

This invention relates to soil openers for planting bulbs and the like, and more particularly to devices of this nature having relatively short handles, and adapted for use while the gardener is in a squatting position, for forming holes in properly prepared garden beds, preliminary to planting bulbs or transplanting plants.

The primary object of the invention is the provision of a relatively simple and easily operable tool or implement by which the hole can be formed in a convenient and expeditious manner.

Another object is to provide a tool in which the jaws are normally held together tightly at their lower ends, so that they will act properly in opening up the soil, and in which the jaws can be separated for making the hole with the expenditure of a minimum amount of effort.

In the accompanying drawing, in which I have shown a preferred form of my implement:

Fig. 1 is a side elevation showing the jaws in the normal closed position, the open position being partially indicated by dotted lines;

Fig. 2 is a view at right angles to Fig. 1; and

Fig. 3 is a section on line 3—3 of Fig. 1.

The main parts of the improved implement include curved, pointed jaw members 5 and 6, respectively, a long handle member 7 provided on jaw 5, a short handle member 8 pivoted on handle member 7, an arm 9 rigid with jaw 6, a link 10 connecting the parts 8 and 9, and a spring 11 acting on arm 9 in such a manner as to urge the lower ends of jaws 5 and 6 into engagement with each other.

It will be seen that the jaws 5 and 6 are pointed at their lower ends, so that when closed they form together a pointed structure, and when opened, as shown by the dotted lines in Fig. 1, create a structure of approximately cylindrical shape that will form a cylindrical hole. The jaws are pivoted together at their side edges and intermediate of their ends by means of pivot pins 12. The lower end portion 7ª of handle member 7 is attached to the upper part of jaw 5 by suitable means such as rivets 7ᵇ, and this handle member is curved upwardly and laterally approximately in the form of an S, as shown in Fig. 1, to provide a portion 7ᶜ overhanging jaw member 6. At its upper extremity the member 7 has a substantially straight lateral portion adapted to be grasped by the palm of the hand, and the same hand grasps the handle portion of member 8 to bring it closer to the free end portion of handle member 7 and thereby open up the jaws. Handle member 8 is pivoted intermediate of its ends, but at a point nearer to its inner end, to a cross bar 13 connecting the upper and lower branches of member 7. The pivoting is effected by a pin 14 passing through handle member 8 and through cross bar 13, and said cross bar is disposed in and operates within a slot 15 formed in member 8.

At its inner end member 8 is forked, as shown at 16, and is provided with a pivot 17 by means of which it is pivotally connected with link 10, which link enters the fork 16. At the opposite end of the link 10, the latter enters a slot 18 in the inner end portion of laterally extending arm 9, and is pivoted to said arm within said slot by a pivot pin 19. The spring 11 is a helical spring by preference, and in the form shown is connected at one end to the inner extremity of arm 9 by a perforation in said extremity, while at its other end the spring is connected to a pin 20 on handle member 7. Preferably this pin 20 is located within a slot 21, which is provided in the intermediate portion of handle member 7, so that the link member 10 can work in and through said intermediate portion without interference.

It will be observed that the device can be readily opened for creating a hole in the prepared soil, after it has been thrust into the soil, by grasping and drawing together the handle parts of the members 7 and 8. It will also be noted that in the form shown the inner extremity of arm 9 is formed with a slant or bevel, as shown at 22, and that in the open position of the jaws this portion 22 abuts the portion 7ª of handle member 7. In this manner an effective stop is provided for arresting the opening of the jaws at the proper point.

The arm member 9 is preferably secured to jaw 6 by rivet members 9ᵇ. In the form shown the members 7, 8 and 9 are constituted by round metallic rods bent to the required shape, but variation may be made in this respect.

My improved tool is of comparatively light weight and of simple construction, and can be readily and conveniently held and operated by the use of one hand only. It can be used very conveniently in a squatting position. By the use of one hand it can be thrust down sufficiently far into the soft soil, and then opened, to form the hole, and then withdrawn. Very little power is required to open the jaws, and when the handles are released the spring immediately returns the jaws to the closed position. Owing to the fact that the pivot 14 is nearer to the inner end of member 8 than it is to the outer end, some leverage is provided for opening the jaws. In the operation of opening, the link 10 is pressed down by the inner end of member 8, and thereby presses down the inner end of arm 9 to carry jaw 6 to the open position. It will be observed that pivot pin 19 in Fig. 1 is somewhat to the right of a line drawn between pivots 12 and 17. This permits ready starting of the opening movement of jaw 6.

While I have shown a preferred embodiment of my invention, it is to be understood that the invention is susceptible of various embodiments, and that many modifications and changes in the details may be made without departing from the principles of my invention or the scope of the annexed claims.

What I claim is:

1. A soil-opening implement comprising a pair of curved pointed jaws having opposing edges and pivoted together at their inner edges intermediate of their ends, a handle member comprising a bent rod rigidly attached to one of said jaws adjacent its upper end and having a laterally directed handle portion, a second handle member pivotally mounted on the intermediate portion of the first for cooperation therewith in opening the jaws, means connecting said second handle member with the second jaw, and a spring normally holding the jaws in the closed position.

2. A soil-opening implement comprising a pair of jaws pivoted together, a handle member rigid with the upper portion of one of said jaws and extending upwardly therefrom and having a laterally extending handle part, an operating device for opening the jaws having a handle part pivoted intermediate of its ends adjacent said first-named handle part, means including a link connected to one end of said second handle part for connecting said operating device with the upper portion of the second jaw, and a spring normally holding said jaws in the closed position.

3. A soil-opening implement comprising a pair of jaws pivoted together, a handle member secured rigidly to the upper portion of one of said jaws, a short arm secured rigidly to the other jaw, means mounted on said first member for operating said short arm by grasp of the operator's hand, and a spring normally holding the jaws closed, said first handle member being substantially S-shaped and presenting a portion extending laterally over the other jaw above the same, said handle portion supporting said operating means.

4. A soil-opening implement comprising a pair of curved jaws having opposing side edges, means for interpivoting said jaws intermediate of their ends, a handle member rigidly attached to the upper end of one of said jaws and bent laterally so as to overhang the other jaw, and then bent laterally in the opposite direction to provide a handle extremity, and means mounted on said handle member and connected with the other jaw and having a laterally extending handle extremity alongside the first-named handle extremity.

5. A soil-opening implement comprising jaws of curved cross section having opposing side edges adapted to form at their lower ends a closed pointed structure, means for pivoting said jaws together intermediate of their upper and lower ends, a generally S-shaped member fixed to the upper end portion of one of the jaws, a cross bar connecting the branches of said member, a handle portion pivoted intermediate of its ends on said cross bar, an arm extending laterally from the other jaw, a link connecting said arm with the inner end of said handle portion, and a coiled spring connecting the inner end of said arm with an adjacent portion of said S-shaped member, said link operating in slots in the S-shaped member and arm.

6. A soil-opening implement comprising a pair of jaws arranged side by side and having opposing side edges, means for pivoting said jaws together intermediate of their ends, a short arm projecting laterally and inwardly from the upper end of one of said jaws, a handle member secured to the upper portion of the other jaw, and means mounted on said handle member and cooperating with said short arm for causing separation of the lower ends of the jaws, the free extremity of said short arm co-acting with an adjacent portion of said handle member to form a stop for arresting the opening movement of the jaws.

JOHN M. BOORDSEN.